(12) United States Patent
Romain et al.

(10) Patent No.: US 8,306,218 B2
(45) Date of Patent: Nov. 6, 2012

(54) PROTECTED ENCRYPTION METHOD AND ASSOCIATED COMPONENT

(75) Inventors: Fabrice Romain, Aix En Provence (FR); Yannick Teglia, Marseilles (FR)

(73) Assignee: Stmicroelectronics SA, Montrouge (FR)

( * ) Notice: Subject to any disclaimer, the term of this patent is extended or adjusted under 35 U.S.C. 154(b) by 1750 days.

(21) Appl. No.: 10/467,698

(22) PCT Filed: Feb. 6, 2002

(86) PCT No.: PCT/FR02/00453
§ 371 (c)(1),
(2), (4) Date: Dec. 5, 2003

(87) PCT Pub. No.: WO02/063821
PCT Pub. Date: Aug. 15, 2002

(65) Prior Publication Data
US 2004/0071288 A1 Apr. 15, 2004

(30) Foreign Application Priority Data
Feb. 8, 2001 (FR) .................................... 01 01685

(51) Int. Cl.
*G06F 21/00* (2006.01)
(52) U.S. Cl. .......................................... 380/29; 713/189
(58) Field of Classification Search .................. None
See application file for complete search history.

(56) References Cited

U.S. PATENT DOCUMENTS

| | | | | |
|---|---|---|---|---|
| 5,168,521 A * | 12/1992 | Delaporte et al. | ............... | 380/29 |
| 5,949,884 A * | 9/1999 | Adams et al. | ................... | 380/29 |
| 5,987,124 A * | 11/1999 | Matyas et al. | .................. | 380/37 |
| 6,278,783 B1 * | 8/2001 | Kocher et al. | ................. | 380/277 |
| 6,295,606 B1 * | 9/2001 | Messerges et al. | ........... | 713/189 |
| 6,940,975 B1 * | 9/2005 | Kawamura et al. | ............. | 380/37 |
| 6,973,190 B1 * | 12/2005 | Goubin | ......................... | 380/263 |
| 2003/0028771 A1 * | 2/2003 | Kocher et al. | ................ | 713/172 |
| 2003/0061498 A1 * | 3/2003 | Drexler et al. | ................ | 713/189 |
| 2007/0076890 A1 * | 4/2007 | Muresan et al. | .............. | 380/287 |
| 2007/0177721 A1 * | 8/2007 | Itoh et al. | ........................ | 380/28 |

OTHER PUBLICATIONS

Schneier, Bruce, Applied Cryptography, Second Ed., 1996, John Wiley and Sons, Inc., Chapter 12, pp. 265-301.*
FIPS PUB 46-3, Data Encryption Standard (DES), 1999, U.S. Department of Commerce / NIST, pp. 1-22.*

* cited by examiner

*Primary Examiner* — Eleni Shiferaw
*Assistant Examiner* — Jeffrey Williams
(74) *Attorney, Agent, or Firm* — Allen, Dyer, Doppelt, Milbrath & Gilchrist, P.A. Attorneys at Law

(57) ABSTRACT

The protected method of cryptographic computation includes N computation rounds successively performed to produce an output data from an input data and a private key. The method also includes a first masking stage to mask the input data, so that each intermediate data used or produced by a computation round is masked, and a second masking stage to mask data manipulated inside each computation round.

26 Claims, 4 Drawing Sheets

PROTECTED ENCRYPTION METHOD AND ASSOCIATED COMPONENT

FIELD OF THE INVENTION

The present invention relates to a component and secured method for cryptographic computation with a secret or private key, and more particularly, to the protection of such components against physical attack which are designed to obtain information on the secret or private key through the power consumption or the electromagnetic radiation of the component when it implements the encryption method.

BACKGROUND OF THE INVENTION

Components with strictly controlled access to the services and/or to the data typically have an architecture formed around the microprocessor and a program memory including the secret key. Such components are used for example in smart cards, especially for banking applications, via a control terminal or remote terminal. Such components use one or more secret key encryption or private key encryption methods to compute an output data from an input data. Such a method is used for example to encipher, decipher, authenticate or sign an input message or else verify the signature of the input message.

To ensure the security of the transactions, the secret key or private key encryption methods are constructed in such a way that it is not possible to determine the secret key used from the knowledge of the input data and/or the output data of the algorithm. However, the security of a component relies on its capacity to keep the secret key that it uses concealed, for this key cannot be modified.

One method frequently used is the DES (Data Encryption Standard) type method. This method can be used for example to give an enciphered message MS (or output data) encoded on 64 bits, from a plaintext message ME (or input data) also encoded on 64 bits, and a secret 56-bit key $K_0$. The main steps of the DES are described in detail with reference to FIG. 1. After an initial permutation IP, the block formed by the permutated bits of the input data is separated into a left-hand part $L_0$ and a right-hand part $R_0$.

After this, 16 rounds of identical operations are performed. During each round of operations, the right-hand part $(R_0, \ldots, R_{15})$ of an intermediate data computed during the previous round of operations is combined with a derivative key $(M_1, \ldots, M_{16})$ during a transformation called a transformation F. The result of the transformation F is then added (XOR operation) to the left-hand part $(L_0, \ldots, L_{15})$ of the intermediate data computed during the previous round of operations.

After the $16^{th}$ round of operations, the left-hand part $L_{16}$ and right-hand part $R_{16}$ of the $16^{th}$ intermediate data are assembled and a final permutation $IP^{-1}$, which is the inverse of the initial permutation IP, terminates the procedure. An i-ranking round of operations included between 1 and 16 is described in detail with reference to FIG. 2. The 56 bits of an intermediate key $K_{i-1}$ computed during the previous round are shifted (operation $S_i$) to give a new updated intermediate key $K_i$, then 48 bits out of 56 are selected by an operation PC of permutation/compression to provide a derived key $M_i$. $M_i = PC(K_i) = PC(S_i(K_{i-1}))$. The association of the steps PC and $S_i$ forms a key computation step ET2.

In parallel, the transformation F is carried out. The right-hand part $R_{i-1}$ of a piece of intermediate data computed during the previous round is extended to 48 bits by an expansion (operation E), combined with the derived key M by an XOR type operation, replaced by 32 new bits by a substitution operation (represented by the operation SBOX), then permutated once again (operation P). In practice, the operations F, P, E, PC, SBOX are identical for all the rounds. On the contrary, the operations $S_1$ to $S_{16}$ used during the computation of the derived keys $K_1$ to $K_{16}$ are different from one round to another.

All the characteristics of the operations IP, $IP^{-1}$, P, PC, E, SBOX, $S_i$ performed during the implementation of a DES method are known: the computations made, the parameters used, etc. These characteristics are, for example, described in detail in the patent application WO 00/46953 or in the "Data Encryption Standard, FIPS PUB 46", published on $15^{th}$ Jan. 1977.

The security of a component using a secret key or private key encryption method lies in its capacity to keep the key that it uses secret. To be secure, a component must be capable especially of keeping concealed the secret key that it uses when it undergoes a DPA (Differential Power Analysis) type analysis. In a DPA analysis, a statistical analysis is made of the consumption of the component, namely the trace left by the component as a function of time. For this purpose, a sample of about 1,000 measurements of traces is used, each trace corresponding to input data ME[i=1 to 1000] that are different and independent with respect to one another. The statistical study validates one or more assumptions made on the value of the bits of the secret key used.

A specific example of the implementation of a DPA type analysis on a component using a DES type encryption method is described in detail in WO 00/46953, especially in pages 3, 4 of this publication. The DES type encryption method is especially vulnerable to the DPA type attacks at the output of the SBOX operators. More generally, an encryption method is vulnerable to a DPA type analysis at any point where the secret key appears in combination either with the input data or with the output data. Thus, in practice, a DES type method is vulnerable to attack at output of all the operators (XOR, P, E, PC, SBOX, etc) of all the rounds of operations because the secret key is mixed with the input data of the first round of operations.

For example, with the input data ME being known, and making assumptions on the secret key $K_0$, it is possible to predict the value of at least one bit of the intermediate data element $(L_1, R_1)$ given at output of the first round of operations. The prediction is verified, then the assumption made on the secret key is verified.

To be secure, a component must also be capable of keeping the secret key that it uses concealed, when it undergoes an SPA type analysis (Simple Power Analysis). In an SPA analysis, the component is made to execute the encryption method that it uses several times by applying the same input data ME to it, and, for each execution of the method, the trace left by this execution is measured as a function of time. The trace represents, for example, the power consumption of the component or the electromagnetic energy radiated as a function of time. The set of measurements is then averaged to filter the noise from the measurement and obtain the real trace of the circuit for a fixed input data ME. For example, a set of 10 to 1000 identical measurements may be enough to filter the noise from the measurement and obtain the real trace of the component for a fixed input data ME. After filtering, the different steps of the DES method can be seen clearly on the real trace of the component: initial permutation IP, 16 rounds of operations and then final permutation IP-1.

A DES type method is sensitive to SPA type analysis especially at the points where the secret key appears, in its initial form $K_0$ or in another form (intermediate keys $K_1, \ldots, K_{16}$, derived keys $M_1, \ldots, M_{16}$). Indeed, by an SPA type analysis it is possible, for each round i of operations, to determine an image of the derived key $M_i$. For example, it is possible to identify the time interval during which the derived key $M_i$ is transferred before the execution of the XOR operation. Since all the derived keys $M_1$ to $M_{16}$ are obtained from the secret key $K_0$ by known operations, a knowledge of simple images of the derived keys gives a information on the secret key $K_0$.

In general, all the encryption methods are more or less sensitive to DPA type attacks, especially at the places where there appears a predictable intermediate result that is a combination of the input data (or a data derived from the input data) and of the secret or private key (or of a key obtained from the secret or private key) or else that is a combination of the output data (or a data derived from the input data) and of the secret key (or of a key obtained from the secret key). An intermediate result of this kind is indeed predictable, from the input data and/or from the output data and from assumptions on the key used, because the encryption methods used (the operators used, the order of use of these operators, etc) are known. A DPA attack then gives information on the key used by validating the assumptions made.

In practice, all the methods are sensitive at output of all the operators of all their steps (or sub-steps) using the input data (or a data derived from the input data), once the input data has been mixed with the secret key for a first time. In the same way, all the methods are also sensitive at output of all the operators giving a result that depends on the output data and on the secret or private key, and this is the case once the input data has been mixed for a first time with a secret or private key.

In the same way, all the encryption methods using secret keys are more or less sensitive to SPA type analysis. Their sensitivity is especially great at places where the key appears alone, in its initial form or during a step known as a critical step, during which the secret key is used either directly or in a derived form obtained by a known law of derived key scheduling. A critical step of this kind is for example an intermediate or derived key scheduling step in which the key is computed from a secret or private key or else from a previously computed intermediate key.

SUMMARY OF THE INVENTION

It is an object of the invention to implement a secured method of cryptographic computation with secret or private key that is made immune to any physical attack of the DPA type, namely a secured method of cryptographic computation whose trace, during the implementation of the method, gives no information on the key that it uses, whatever the input data used by the method, whatever the number of uses of the method, and even if a statistical study of the trace is made.

Another object of the invention is to implement a secured method of cryptographic computation with secret or private key that is also protected against any SPA type attack.

With these goals in view, the invention relates to a protected method of cryptographic computation, the method comprising N computation rounds successively performed to produce an output data from an input data and a secret key. According to the invention, the method also comprises a first masking stage to mask the input data, so that each intermediate data used or produced by a computation round is masked, and a second masking stage to mask data manipulated inside each computation round.

The invention also relates to an electronic component using a method of the kind described here above and here below detailed. The word "masked" (or "mixed") should be understood here and in the rest of the document in the following sense: in a method according to the invention, a data, a result, an operand are said to be masked if they have a different value during two executions of the method, especially during two executions of the method using the same input data and the same secret or private key.

Thus, with the invention, the data given by a computation round is masked because the input data is masked before the computation round (first masking stage). The data given by a computation round is therefore different at each execution of the method, even if the input data and the secret key used are identical.

Furthermore, the second masking stage used in a method according to the invention enables the masking of all data manipulated inside a computation round. Thus, the two masking stages used in the invention enable the masking of each data manipulated during the method, inside or outside the computation rounds. A statistical study of the consumption (or the electromagnetic radiation) of the component using a method according to the invention is therefore bound to fail: it cannot be used to obtain information on the secret key used since the power consumption of the component is decorrelated from the value of the key used.

To perform the first masking stage, the following steps are preferably performed: a first masking step ET01 carried out before the first computation round (round 1), to mask the input data, and a first unmasking step ET10 applied after the $N^{th}$ computation round (round N), to give the non-masked output data.

To perform the second masking stage, the following steps are preferably performed, in a i-ranking computation round of the method: a second masking step ET3 to mask a result of a previous step of the i-ranking computation round; a substitution step ET6 to substitute the masked result by using a masked, non linear operator SBOX'; and a second unmasking step ET9 to unmask the result of the step ET6.

During the first masking step ET01, a first masking parameter is mixed with the input data ME to give a masked input data at the first computation round, the mixing being done through the use of a first linear mixing operator. To provide the method with maximum security, the first masking parameter is preferably chosen randomly at each implementation of the method during the masking step. The first masking parameter can also be chosen randomly only at intervals corresponding to every M cases of implementation of the method. In this case, the same masking parameter is used for the M following cases of implementation.

The first masking step thus makes it possible, by mixing the data input with a random parameter, to eliminate every correlation between the input data ME and dataan intermediate data obtained from the input data ME and used or produced by a computation round. During the first unmasking step, at the end of the method, the contribution made by the first masking parameter to the result of the N-th computation round is subtracted from the result of the N-th computation round. The unmasking step thus makes it possible, at the end of the method, to retrieve the expected output data. In particular, if the method is performed twice with the same input data and the same secret key, then the output data MS obtained is the same in both cases. On the other hand, the intermediate data are different.

For the implementation of the second masking stage, the method also preferably comprises a third masking step ET03, carried out before the first computation round, to produce the masked non linear operator SBOX' verifying the following relation, for each data A:

$SBOX'(A \oplus X_3) = SBOX(A) \# X_2$, where
- $X_2$ is a second masking parameter,
- $X_3$ is a third masking parameter,
- SBOX is a known non linear operator,
- "#" is a second mixing operator and
- "@" is a third mixing operator.

Preferably, at least one of the masking parameters used is randomly chosen at each implementation of the method, to obtain the maximum security.

According to another embodiment, one of the masking parameters may be randomly chosen every M instances of implementation of the method. Preferably also, the mixing operators are linear. As an example, the XOR operator may be chosen for one of the mixing operators.

If the method according to the invention comprises a derived key scheduling step to give a derived key from the secret key according to a known key scheduling law, then the method is advantageously complemented by the addition of a fourth masking step, performed before the derived key scheduling step, to mask the secret key so that the scheduled derived key is different at each implementation of the method.

Thus, the derived key or keys and/or the intermediate scheduled key or keys are all masked by the addition of a random parameter so that an analysis if the power consumption of the component, of the SPA type for example, cannot provide any information on the secret key used. According to an embodiment, during the fourth masking step, a randomly chosen masking parameter is mixed with the secret key via a fourth masking operator, to give a masked secret key, the masked derived key being computed from the masked secret key.

BRIEF DESCRIPTION OF THE DRAWINGS

The invention will be understood more clearly and other features and advantages of the invention shall appear from the following description of exemplary forms of implementation of protected methods of cryptographic computation according to the invention. The description will be made with reference to the appended drawings, of which.

DETAILED DESCRIPTION OF THE PREFERRED EMBODIMENTS

Figure 1:
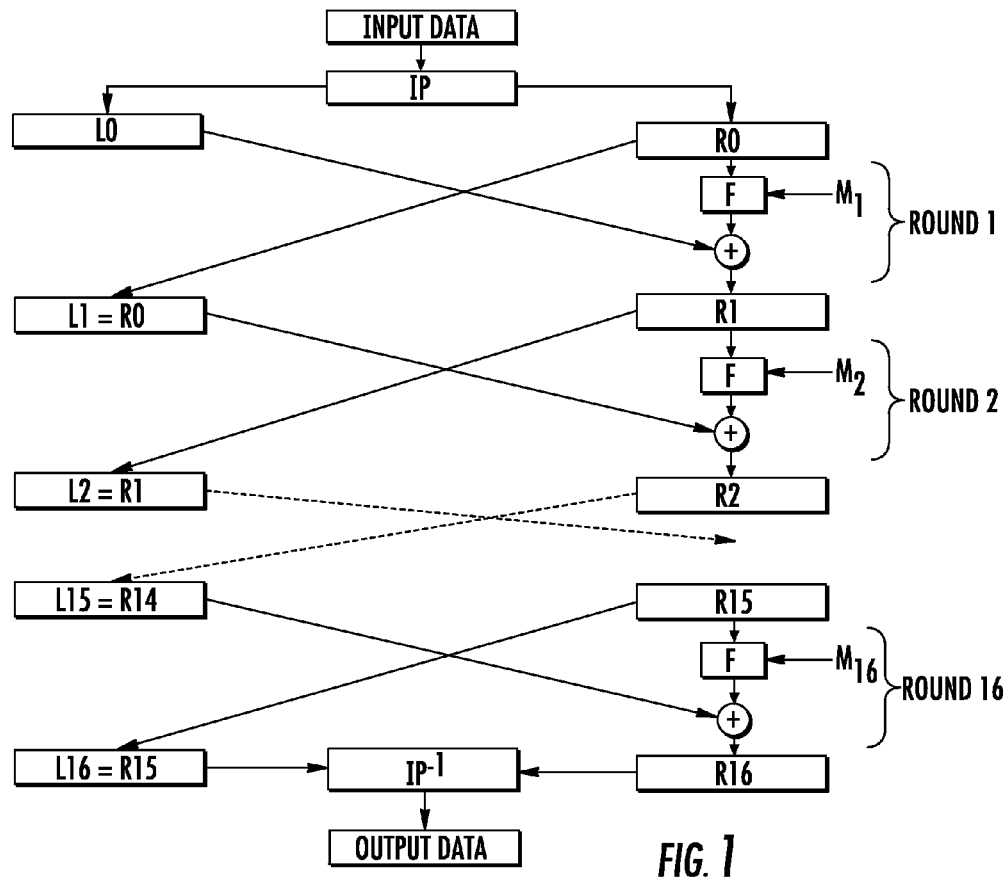
FIG. 1, already described, is a flowchart illustrating a DES type known encryption method using a secret key.
Figure 2:
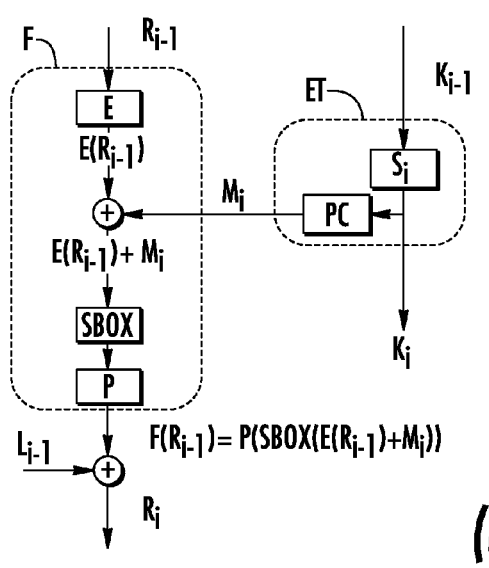
FIG. 2 already described is a schematic drawing detailing a step of the method of FIG. 1.
Figure 3A:
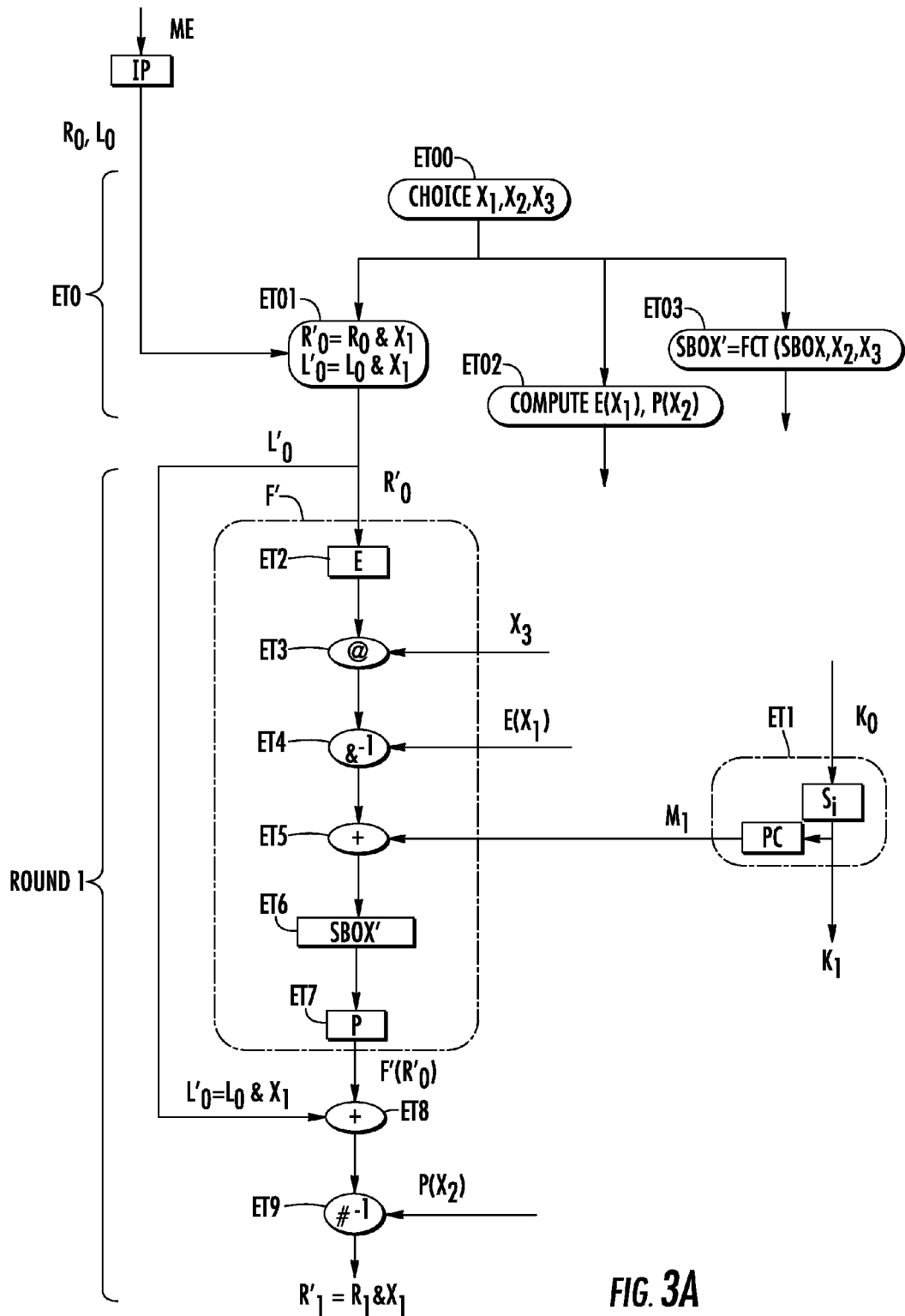
FIGS. 3a, 3b are schematic drawings illustrating the method secured according to the invention.
Figure 3B:
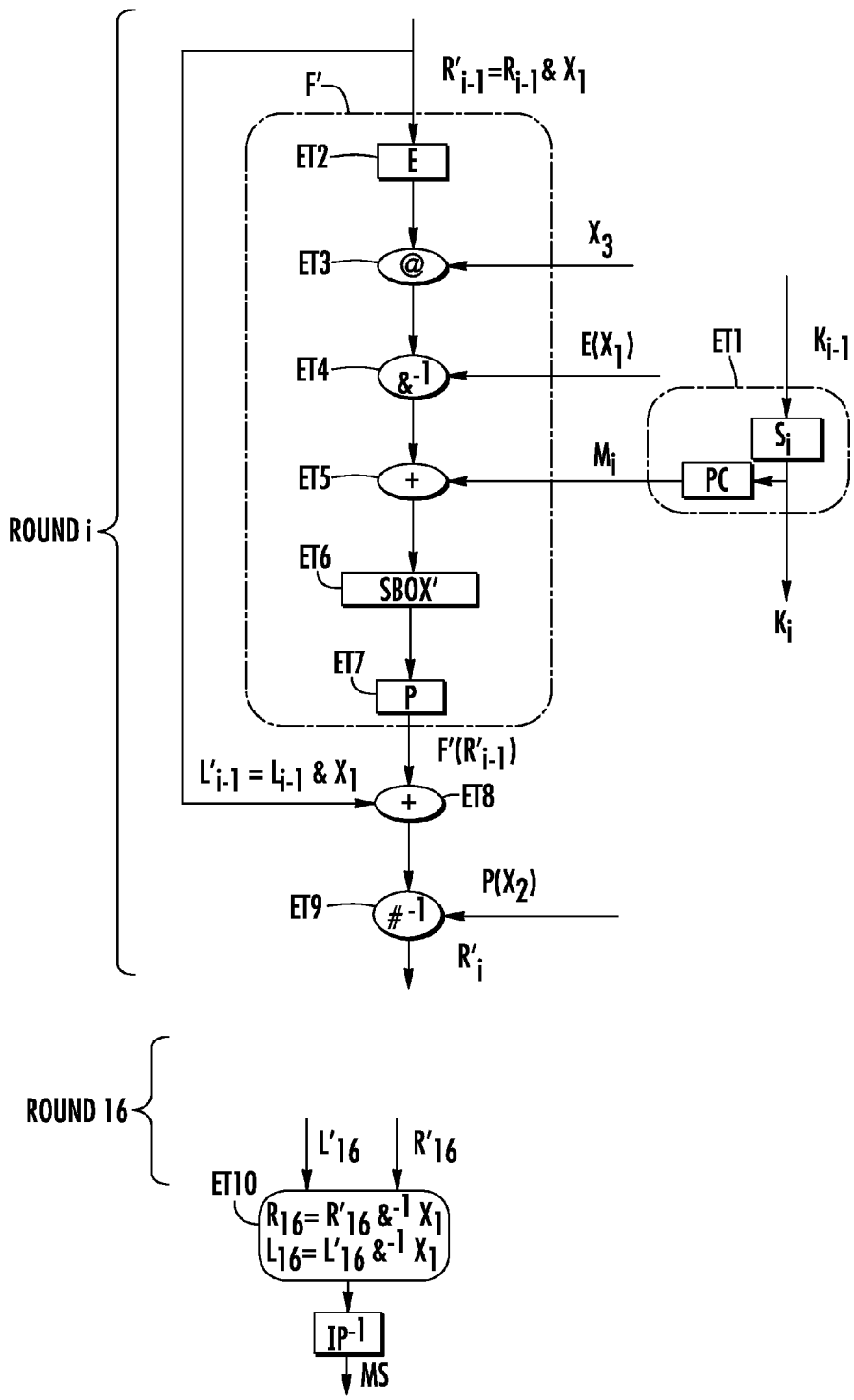

FIGS. 3a, 3b show how the DES method of the FIGS. 1, 2 is secured with the invention. To simplify, only the first computation round and the i-ranking computation round have been represented FIGS. 3a, 3b with the characteristic steps of the invention. i is an integer comprised between 1 and 16. As previously explained, a DES method computes an output data from a secret key $K_0$ and from an input data ME; the DES method comprises 16 computation rounds, preceded by an initial permutation IP (FIG. 3a) and followed by a final permutation $IP^{-1}$ (FIG. 3b), inverse of the initial permutation. Each computation round comprises (FIG. 2) a derived key scheduling ET1, a transformation step F' and a combination step ET8 with an XOR operator.

The DES method is secured according to the invention by the addition of two masking stages. The first masking stage comprises a masking step ET01 (FIG. 3a) and an unmasking step ET10 (FIG. 3b). The second masking stage is performed at each computation round, it comprises a masking step ET3, a substitution step ET6 by a masked non linear operator SBOX' and a unmasking step ET9.

In the example of FIGS. 3a, 3b, the method comprises an initialization step ET0 comprising fourth sub steps ET00 to ET03. The object of the initialization step is to perform the first masking stage (step ET01: masking of the input data ME) and to prepare the second masking stage (by computation of the non linear operator SBOX'). The second masking stage is then perform at each computation round. During the step ET00, three masking parameters $X_1$, $X_2$, $X_3$ are chosen randomly. They are modified for example at each implementation of the method. They may also be modified only each M instances of implementation of the method.

During the step ET01, the left-hand and right-hand parts of the input data are separated and then masked by the parameter $X_1$, to thus give a masked left-hand part $L'_0 = L_0 \& X_1$ and a masked right-hand part $R'_0 = R_0 \& X_1$. The masking is done via the first masking operator "&". The operator "&" is chosen to be linear with respect to the two variables that it mixes. In one embodiment, the operator "&" is an XOR operator. The operator "&" may also be any type of linear operator. In general, the operator "&" has the following properties, whatever the data A, B, C:

"&" has parity 2: it takes two arguments as parameters;

"&" verifies: $E(A \& B)) = E(A) \& E(B)$, E being a linear operator;

"&" verifies $(A \oplus B) \& C = A \oplus (B \& C)$, $\oplus$ being the XOR operator.

There is an operator "$\&^{-1}$", the inverse of "&", such that: $(A \& B) \&^{-1} A = B$,; as the case may be "&" and "$\&^{-1}$" may be identical.

During the step ET02, variables $VX1 = E(X_1)$, $VX2 = P(X_2)$ are computed. The operators E, P are respectively an expansion, and a simple permutation, as defined in the known DES type method. During the step ET03, a new non-linear operator SBOX' is computed by the relationship:

$$SBOX' = FCT(SBOX, X_2, X_3)$$

where SBOX is the non-linear operator used in a known DES method, $X_2$, $X_3$ are the random parameters, and FCT is a function such that:

$SBOX'[A@X_3] = SBOX[A] \# X_2$, for any value of A.

"@", "#" are linear mixing operators having properties similar to those of the operator "&".

"&", "#" may be different from each other, and they may also be different from the operator "&".

Figure 4:
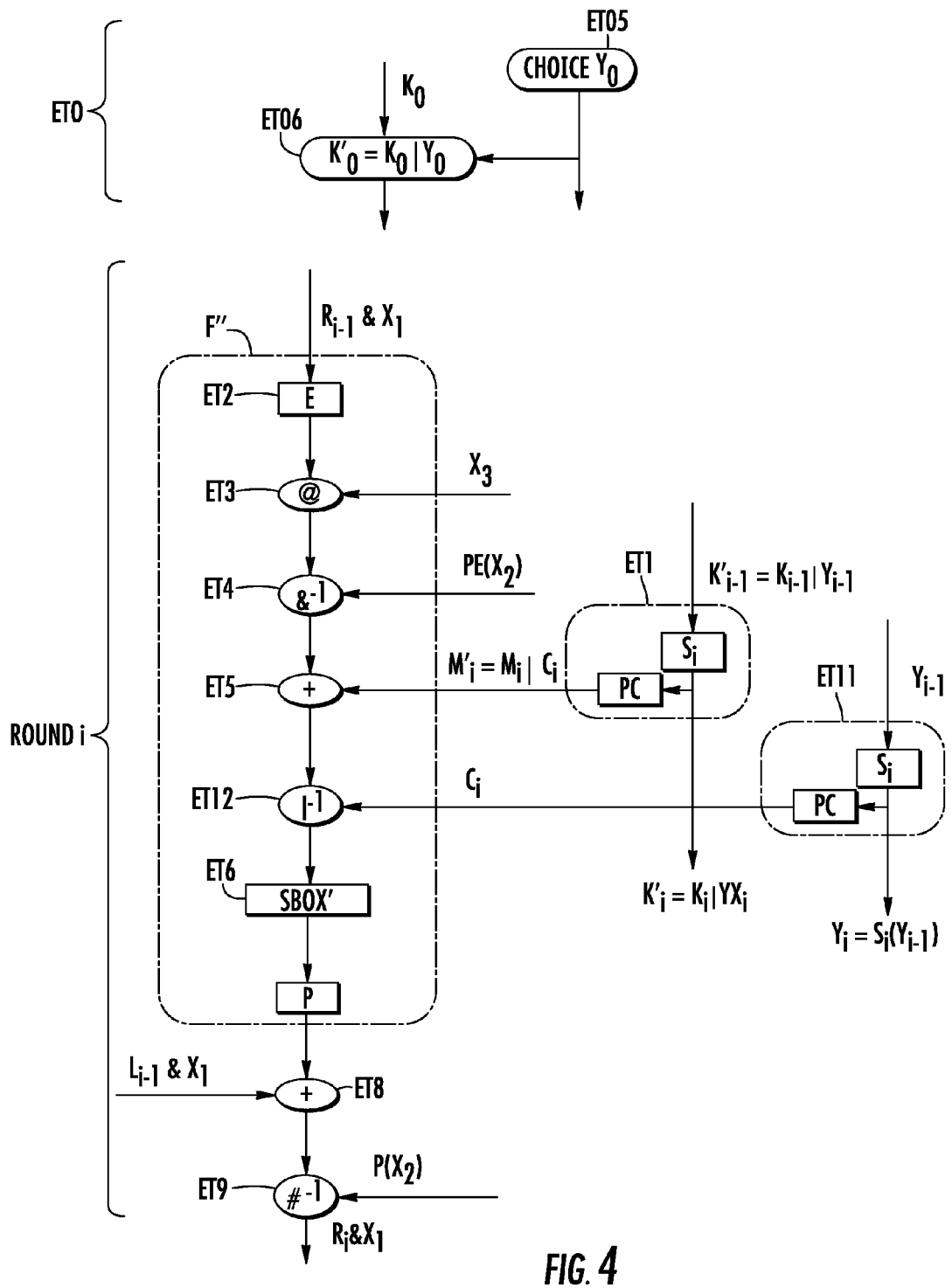
FIG. 4 is a schematic diagram of another embodiment of the method of FIGS. 3a, 3b.

The first round of operations is then carried out; it can be sub-divided into nine steps ET1 to ET9. During the key-scheduling step ET1, a derived key $M_1$ is computed from the secret key $K_0$. The first updated derived key $M_1$ is given by the relationship: $M_1 = PC(S_1(K_0)) = PC(K_1)$. $K_1$ is a first updated intermediate key, which will be given thereafter at the second round of operations (not shown in FIGS. 4a, 4b). The operators PC, $S_1$ are respectively a permutation-compression and a bit-shifting operation as defined in the case of a known DES method. The step ET1 is thus identical to a key-scheduling step as defined in the context of a known DES method.

The following steps ET2 to ET8 form a transformation step F', that corresponds to the transformation F of a prior art method, modified by the addition of the steps ET3, ET4 and the replacement of the operator SBOX by the new operator SBOX' according to the invention. During the step ET2, an expansion is made on the data $R'_0$. The result $E(R'_0)$ of this operation is then mixed with the parameter $X_3$ by means of the second masking operator "@".

The next step ET4 is a first unmasking step designed to remove, from the result of the previous operation, the contribution to this result made by the masking parameter $X_1$. To this end, the following operation is carried out:

$$[E(R'_0)@X_3]\&^{-1}VX_1 = [E(R'_0)@X_3]\&^{-1}E(X_1) =$$

$$= E(R_0)\&E(X_1)@X_3\&^{-1}E(X_1$$

$$) = E(R_0)@X_3$$

During the next step ET5, the result of the previous step ET4 is mixed with the updated derived key $M_1$ by an XOR operation. The step ET5 thus gives the result: $E(R_0)@X_3 \oplus M_1 = E(R_0) \oplus M_1@X_3$.

During the step ET6, the non-linear operation SBOX' is performed on the result of the previous operation. The step ET6 gives the result:

$$SBOX'[E(R_0) \oplus M_1@X_3] = SBOX[E(R_0) \oplus M_1] \# X_2.$$

This results from the definition of the non-linear operator SBOX'.

A bit-permutation operation P is then applied to this result (step ET7). We thus obtain:

$$F'(R'_0) = P[SBOX[E(R_0) \oplus M_1] \# X_2]$$

$$= P[SBOX[E(R_0) \oplus M_1]] \# P(X_2).$$

This result is deduced simply from the linearity of the operator P.

During the step ET8, the result of the permutation P is then added (by means of an XOR operation) to the data $L'_0$ computed during the step ET01. The step ET8 is similar to the corresponding step of a known DES method. We then obtain:

$$P[SBOX[E(R_0) \oplus M_1]] \# P(X_2) \oplus L'_0$$

$$= [P(SBOX[E(R_0) \oplus M_1]) \# P(X_2)] \oplus L_0 \& X_1$$

$$= [P[SBOX[E(R_0) \oplus M_1]] \oplus L_0] \& X_1 \# P(X_2)$$

$$= R_1 \& X_1 \# P(X_2)$$

where $R_1$ is the right-hand part of the first intermediate data ($L_1$, $R_1$) as defined in the context of the known DES type method. Here too, all the above inequalities are deduced from the fact of the linearity of the operators P, &, #.

The following step ET9 is a second unmasking step that seeks to remove, from the result of the previous operation, the contribution to this result made by the masking parameter $X_2$. To this end, the following operation is carried out:

$$[R_1 \& X_1 \# P(X_2)] \#^{-1} VX_2 = [R_1 \& X_1 \# P(X_2)] \#^{-1} P(X_2) = R_1 \& X_1$$

At the end of the first round, the updated, intermediate data provided is equal to ($L'_1$, $R'_1$), with:

$$L'_1 = R'_0 = R_0 \& X_1 = L_1 \& X_1, \text{ and } R'_1 = R_1 \& X_1.$$

Thus, with the DES method according to the invention, the intermediate data ($L'_1$, $R'_1$) computed during the first round of operations is equal to the intermediate data ($L_1$, $R_1$) given by an unsecured, known DES type method, masked by the random parameter $X_1$ by means of the operator "&". The second round is then performed, in using the new updated intermediate data ($L'_1$, $R'_1$) as well as the updated intermediate key $K_1$ computed during the step ET1.

In general, the $i^{th}$ round of operations of the method can be sub-divided into nine steps ET1 to ET9. During the step ET1, a derived key $M_1$ is computed from an intermediate key $K_{i-1}$, computed during the preceding round, to give an updated derived key $M_{i-1} = PC(S_i(K_{i-1})) = PC(K_i)$. $K_i$ is a first updated intermediate key, which will be given thereafter at the next round of operations (not shown in FIGS. 4a, 4b). The operators PC, $S_i$ are respectively a permutation-compression and a bit-shifting operation as defined in the case of a known DES method.

During the step ET2, the expansion is made on the data $R'_{i-1}$. The result $E(R'_{i-1})$ of this operation is then mixed with the parameter $X_3$ by means of the second masking operator "@".

During the next step ET4, the following operation is carried out:

$$[E(R'_{i-1})@X_3]\&^{-1}VX_1 = [E(R'_{i-1})@X_3]\&^{-1}E(X_1)$$

$$= E(R_{i-1})\&E(X_1)@X_3\&^{-1}E(X_1)$$

$$= E(R_{i-1})@X_3$$

During the next step ET5, the result of the step ET4 is mixed with the updated derived key $M_i$ by an XOR operation. The step ET5 thus gives the result:

$$E(R_{i-1})@X_3 \oplus M_i = E(R_{i-1}) \oplus M_i@X_3.$$

During the step ET6, the non-linear operation SBOX' is performed on the result of the previous operation. The step ET6 gives the result:

$$SBOX'[E(R_{i-1}) \oplus M_i@X_3] = SBOX[E(R_{i-1}) \oplus M_i] \# X_2.$$

This results from the very definition of the non-linear operator SBOX'.

A bit-permutation operation P is then applied to this result (step ET7). We thus obtain:

$$P[SBOX[E(R_{i-1}) \oplus M_i] \# X_2] = P[SBOX[E(R_{i-1}) \oplus M_i]] \# P(X_2).$$

During the step ET8, the result of the permutation P is then added (by means of an XOR operation) to the data $L'_{i-1}$ computed during the previous round. We then obtain:

$$P[SBOX[E(R_{i-1}) \oplus M_i]] \# P(X_2) \oplus L'_{i-1}$$

$$= [P(SBOX[E(R_{i-1}) \oplus M_i]) \# P(X_2)] \oplus L_{i-1} \& X_1$$

$$= [P[SBOX[E(R_{i-1}) \oplus M_i]] \oplus L_{i-1}] \& X_1 \# P(X_2)$$

$$= R_i \& X_1 \# P(X_2)$$

where $R_i$ is the right-hand part of the $i^{th}$ updated data ($L_i$, $R_i$) as defined in the context of the known DES type method. Here too, all the above equalities are deduced from the fact of the linearity of the operators P, &, #.

The following step ET9 is a second unmasking step that seeks to remove, from the result of the previous operation, the contribution to this result made by the masking parameter $X_2$. To this end, the following operation is performed:

$$[R_{i-1} \& X_1 \# P(X_2)] \#^{-1} VX_2 = [R_{i-1} \& X_1 \# P(X_2)] \# P(X_2) = R_{i-1} \& X_1$$

At the end of the $i^{th}$ round, the updated, intermediate data provided is equal to ($L'_i$, $R'_i$), with:

$$L'_i = R'_{i-1} = R_{i-1} \& X_1 = L_i \& X_1, \text{ and } R'_i = R_i \& X_1.$$

Thus, with the DES method according to the invention, the intermediate data ($L'_i$, $R'_i$) computed during the $i^{th}$ round of operations is equal to the intermediate data ($L_i$, $R_i$) given during the same round by a non-secured, known DES method but masked by the random parameter $X_1$ by means of the operator "&".

The new intermediate data $(L'_i, R'_i)$ is then given at the next round. The $16^{th}$ round of the method gives the $16^{th}$ intermediate data $(L'_{16}, R'_{16})$. During a third and final unmasking step ET10, the contribution of the parameter $X_1$ to the $16^{th}$ data is removed by means of the operator $\&^{-1}$: $L_{16}=L'_{16}\&^{-1}X_1$, $R_{16}=R'_{16}\&^{-1}X_1$.

The final permutation $IP^{-1}$, carried out after the step ET10, terminates the DES method according to the invention. The permutation $IP^{-1}$ is identical to the equivalent permutation of a known type of DES method.

With the DES method according to the invention, the output data produced is the same as the one given by a known DES method, inasmuch as the input data element ME and the secret key $K_0$ are identical for the known method and the method according to the invention.

On the other hand, with a method according to the invention (FIG. 3) and contrary to a known DES method (FIGS. 1, 2): the intermediate data of type $(L'_i, R'_i)$ are all masked with the parameter $X_1$ (first masking stage); and the data $(L'_i, R'_i)$ are used or produced by the computation round. All the intermediate results produced by an operation of the P, PC, E, $S_i$, SBOX', XOR $\oplus$ or other type) are masked by at least one of the parameters $X_1, X_2$ or $X_3$ or by a value derived from these parameters $(E(X_1), P(X_2),$ etc.); the second masking stage is thus correctly implemented.

Since $X_1, X_2$ or $X_3$ are chosen randomly at each implementation of the method, the value of all the intermediate results and of all the intermediate data is different at each implementation of the method, whatever the value of the input data $(L_0, R_0)$ or the value of the secret key $K_0$ used by the method of the invention. In particular, the value of all the intermediate results is different, including in the case where the method is implemented twice with the same input data ME and the same secret key $K_0$.

The presence of at least one random parameter suppress any correlation, at the level of an intermediate result or an intermediate data, between the secret key $K_0$ and the input data ME. A DPA type statistical analysis therefore does not enable to obtain information on the secret key used by a secured method according to the invention.

Modifications and/or improvements in the method of FIGS. 3a, 3b are possible, without departing from the framework of the invention. For example, the order in which certain steps of the method are carried out may be modified: The steps IP, ET01, round 1, ..., round i, ..., round 16, ET10, $IP^{-1}$ must be executed in the order presented in FIGS. 4a, 4b if the desired method is has to be similar to that of FIGS. 1, 2.

The step ET00 must be performed before the step ET01. The step ET00 may be performed before or in parallel with the step IP. The step ET02 is performed between the step ET00 and the step ET4 of the first round of operations; it may be performed before or in parallel with the step IP, the step ET01 and the steps ET1 or ET2. The step ET03 is performed between the step ET00 and the step ET6 of the first round of operations; it may be performed before or after the step ET01, the steps ET1, ET2, ET3 or ET4. For reasons of symmetry, the step ET10 will be carried out after the step $IP^{-1}$ if the step ET01 is performed before the step IP. Conversely, the step ET10 will be performed before the step $IP^{-1}$ if the step ET01 is performed after the step IP. In each round i, the step ET1 must be carried out so that the derived key $M_i$ that it gives is available for the performance of the step ET5; the step ET1 may for example be carried out in parallel with the steps ET2, ET3 or ET4.

In the example described here above with reference to FIGS. 3a, 3b, three random parameters $X_1, X_2, X_3$ are used. This approach masks all the intermediate results in the most efficient way possible. In another example, it is possible to use only two parameters, the parameters $X_1, X_2$. In this case, the step ET02 is limited to the computation of $P(X_2)$, the steps ET3, ET4 of all the rounds of operations are eliminated, and the step ET03 is modified to compute a new non-linear operator SBOX" by the relationship:

$$SBOX''=FCT''(SBOX, X_1, X_2),$$

with FCT" being a function such that:

$$SBOX''(A\&E(X_1))=SBOX(A)\#X_2.$$

Here too, all the intermediate results are masked by a random parameter that is modified at each implementation of the method. In particular, in the i-ranking round, at output of the step ET2, the intermediate parameter $E(R'_0)=E(R_0)\&E(X_1)$ is masked by the derived parameter $E(X_1)$. In the same way, at output of the step ET5, the intermediate result $E(R'_0) \oplus M_i$ is masked by the derived parameter $E(X_1)$. At output of the step ET6, the intermediate result is masked as in the previous example by the parameter $X_2$.

Similarly, in the example described here above with reference to FIGS. 3a, 3b, the three parameters $X_1, X_2, X_3$ are chosen randomly, at each implementation of the method. However, the parameters $X_1, X_2, X_3$ can be modified more or less frequently. For example, it is possible to modify the parameters, especially $X_2$ and/or $X_3$ at each performance of a round i of operations. In this case, the steps ET02, ET03 will be performed at each round to take account of the modified parameters $X_2, X_3$.

In the same spirit, the parameters $X_1, X_2, X_3$ can be modified every M cases of implementation of the method, if it is estimated that M performances are not sufficient to carry out a DPA type attack. M is an integer. In this case, only the step ET01 is performed during the step ET0. The steps ET00, ET02, ET03 are performed only at intervals of every M cases of implementation of the method.

In another major improvement, the method is secured also against SPA type analysis. For this type of analysis, the derived key scheduling steps $M_i$ are particularly vulnerable. The improvement therefore consists in masking the derived keys, in addition to the intermediate results.

The method of FIGS. 3a, 3b is therefore improved by the addition (see FIG. 4): of the sub-steps ET05, ET06 in the initialization step ET0, the steps ET11, ET12 in each of the 16 rounds of operations of the method. With a view to clarity and simplification, only the $i^{th}$ round of the method has been shown in FIG. 4, accompanied by new steps ET05, ET06.

During the step ET05, a fourth parameter $Y_0$ is chosen randomly. The step ET05 is for example carried out simultaneously with the step ET00, or else in parallel with one of the steps IP, ET01, ET02, ET03. During the masking step ET06, performed after the step ET05, the fourth masking parameter $Y_0$ is mixed with the secret key $K_0$, to give a masked secret key $K'_0$. The mixing is done by the following relationship:

$$K'_0=K_0|Y_0.$$

The operator "|" is chosen to be linear with respect to the two variables that it mixes. In one embodiment, the operator "|" is an XOR operator. The operator "|" may also be any type of linear operator. In general, the operator "|" has properties similar to those of the operators "&", "@" or "#".

The first round of operations (not shown in FIG. 4) is then performed. The key scheduling step ET1 is achieved here no longer directly from the secret key $K_0$, but from the masked secret key $K'_0$. The step ET1 gives a masked derived key $M'_1$ according to the relationship:

$$M'_1 = PC(S_1(K'_0)) = PC(S_1(K_0|Y_0)) = PC(S_1(K_0))|PC(S_1(Y_0)).$$

The last equality is deduced simply from the fact that the operators PC, $S_1$ et "|" are linear operators and therefore have especially switching or associative type properties. Since $PC(S_1(K_0)) = M_1$, it is finally deduced therefrom that $M'_1 = M_1|PC(S_1(Y_0))$, $M_1$ being the scheduled derived key computed according to the DES methodcribed with reference to FIGS. 3a, 3b.

The difference computation step ET11 is performed, for example, before, in parallel or after the key scheduling step ET1. The step ET11 determines the contribution $C_i$ given by the parameter $Y_0$ to the masked derived key $M'_i$. The step ET11 is similar to the step ET1; the step ET11 thus comprises an operation $S_i$ to give a masking parameter $Y_1 = S_1(Y_0)$ updated by the shifting of the bits of the parameter $Y_0$, and an operation PC to compute the contribution $C_i$. The contribution $C_1$ is thus computed according to the relationship: $C_1 = PC(S_1(Y_0))$. Finally $M'_1 = M_1|C_1$ is deduced therefrom. The updated masking parameter $Y_1$ for its part is given at the next round of operations.

The unmasking step ET12 is a sub-step of the transformation step F'" (which corresponds to the transformation F' of the DES method according to FIGS. 4a, 4b modified by the addition of the step ET12); the step ET12 is carried out between the step ET5 and the step ET6. The step ET12 seeks to remove the contribution $C_1$ given by the updated masking parameter $Y_1$. For this purpose, the operator "|$^{-1}$", which is the inverse of the operator "|", is used. At output of the step ET12, we have:

$$(E(R_0)@X_3 \oplus M'_1)|^{-1}C_1 = E(R_0)@X_3 \oplus M_1|C_1|^{-1}C_1 = E(R_0)@X_3 \oplus M_1$$

Thus, after the removal of the contribution $C_1$, the variable that appears at the input of the SBOX' type operator (step ET6) is equal to $E(R_0)@X_3 \oplus M_1$, i.e. it is identical to the variable that appears at the input of the operator SBOX' of the DES method described with reference to FIGS. 3a, 3b. Consequently, the output data that appears at output of the transformation F'" is identical to the one that appears at output of the transformation F' of the method of FIGS. 3a, 3b.

More generally, during the $i^{th}$ round of operations, the step ET1 gives a masked, derived key $M'_i$ according to the relationship:

$$M'_i = PC(S_i(K'_{i-1})) = PC(S_i(K_{i-1}|Y_{i-1}))$$

$$= PC(S_i(K_{i-1}))|PC(S_i(Y_{i-1}))$$

$$= M'_i = M_i|PC(S_i(Y_{i-1})),$$

$M_i$ being the derived key computed according to the DES method described with reference to FIGS. 3a, 3b. It may be recalled that the operators PC are identical for all the rounds of the method (the same characteristics, same parameters, etc.). On the contrary, the bit-shifting operations $S_i$ are different from one round of operations to another.

The step ET11 determines the contribution $C_i$ made by the parameter $Y_{i-1}$ (or more generally $Y_0$) to the masked derived key $M'_i$. The step ET11 gives an updated masking parameter $Y_i = S_i(Y_{i-1})$, and an updated contribution $C_i$ according to the relationship: $C_i = PC(S_i(Y_{i-1}))$. It is finally deduced from this that $M'_i = M_i|C_i$. The updated masking parameter $Y_i$ for its part is given at the next round of operations.

The step ET12 is performed between the step ET5 and the step ET6. At output of the step ET12, we have:

$$(E(R_{i-1})@X_3 \oplus M'_i)|^{-1}C_i = E(R_{i-1})@X_3 \oplus M_i|C_i|^{-1}C_i = E(R_{i-1})@X_3 \oplus M_i$$

Thus, after elimination of the contribution $C_i$, the variable that appears at the input of the SBOX' type operator (step ET6) is equal to $PE(R_{i-1})@X_3 + M_i$, i.e. it is identical to the variable that appears at the input of the operator SBOX' of the DES methodcribed with reference to FIGS. 4a, 4b. The output data that appears at output of the transformation step F' is therefore identical to the one that appears at output of the transformation operation F' of the method of FIGS. 3a, 3b.

Finally, with the method of FIG. 5, all the intermediate results are masked by at least one of the parameters $X_1, X_2, X_3$ (or a derived form of these parameters). Furthermore, all the intermediate keys $K'_i$, all the derived keys $M'_i$, are also masked by the parameter $Y_0$ or a derived form of $Y_0$.

That which is claimed is:

1. A method of protecting a cryptographic process within an electronic device including a hardware controller and associated memory storing a secret key, the method comprising:
   a first masking stage comprising a first masking step to mask input data;
   a second masking stage defined by a plurality of computation rounds being successively performed by the hardware controller downstream from the first masking step to produce masked output data based on the masked input data and the secret key, with the masked input data from the first masking step being used so that intermediate data associated with each computation round is masked, and with data being manipulated by the second masking stage within each computation round also being masked, each computation round comprising
      a second masking step to mask a result of a previous computation round,
      a substitution step to substitute the masked result of the previous computation round by using a masked non linear operator (SBOX'), and
      a second unmasking step to unmask a result of the substitution step;
   the first masking stage comprising a first unmasking step performed after a last computation round in the second masking stage to unmask the masked output data therefrom; and
   a third masking step performed before a first computation round to produce the masked non linear operator (SBOX') in the substitution step, with the masked non linear operator SBOX' produced by the third masking step verifying the following relation, for each data (A):

$SBOX'(A@X_3) = SBOX(A)\#X_2$, where $X_2$ is a second masking parameter, $X_3$ is a third masking parameter, SBOX is a non linear operator, " # " is a second mixing operator and " @ " is a third mixing operator.

2. A method according to claim 1, wherein:
   during the first masking step, a first masking parameter is mixed, using a first linear mixing operator, with the input data to provide a masked input data at the first computation round; and
   during the first unmasking step, a contribution made by the first masking parameter to a result of the N-th computation round is subtracted from the result of the N-th computation round.

3. A method according to claim 1, wherein, during the second unmasking step of a computation round, a contribution made by the second masking parameter to the result of masked non linear operator SBOX' is subtracted from the result produced by the masked non linear operator SBOX'.

4. A method according to claim 3, wherein a computation round comprises the following steps, executed in the following order:
- (ET2) expansion of a right-hand part of a masked intermediate data previously computed by a preceding computation round;
- (ET3) masking of the result of the preceding step ET2 by the third masking parameter using the third mixing operator;
- (ET4) removal of a contribution made by the first masking parameter from the result of the previous step ET3;
- (ET5) mixing of the result of the previous step with an updated derived key;
- (ET6) substitution of the result of the previous step ET5 by the masked non-linear operator SBOX' and supply of a result that is masked by the second masking parameter;
- (ET7) permutation of the result of the previous step ET6;
- (ET8) addition, via an XOR operation, of a left-hand part ($L'_{i-1}$) of the previously computed intermediate data to the result of the previous step ET7; and
- (ET9) removal of the contribution made by the second masking parameter to the result of the previous step ET8, to provide a right-hand part of the updated intermediate data, of which a left-hand part is equal to the right-hand part of the previously computed intermediate data.

5. A method according to claim 4, wherein at least one of the masking parameters is chosen randomly.

6. A method according to claim 5, wherein at least one of the first mixing operator, the second mixing operator and the third mixing operator is a XOR operator.

7. A method according to claim 6, further comprising:
- a derived key scheduling step to provide an updated derived key from the private key according to a key scheduling process;
- a fourth masking step, performed before the derived key scheduling step, to mask the private key using a mixing parameter so that the updated derived key is different for each key scheduling process.

8. A method according to claim 7, wherein the key scheduling process comprises a plurality of derived key scheduling steps executed successively, a derived key scheduling step providing a masked updated derived key at a same computation round and providing an updated masked private key from a previously computed masked private key;
wherein the same computation round comprises the following steps, performed between step ET3 and step ET6:
- (ET5) mixing of a result with the updated masked derived key; and
- (ET12) removal of the contribution made by the mixing parameter from the result of the step ET5.

9. A method according to claim 8, wherein the fourth masking step is performed before the first derived key scheduling step.

10. A method according to claim 8 wherein the fourth masking step is performed before each derived key scheduling step.

11. A method according to claim 7 wherein, during the fourth masking step, a randomly chosen masking parameter is mixed with the private key via a fourth masking operator to provide a masked private key, the masked derived key being computed from the masked private key.

12. A method according to claim 11 wherein, during the fourth masking step, the following operation is performed:

$$K'_0 = K_0 | Y_0,$$

$K'_0$ being the masked secret key,
$K_0$ being the secret key,
$Y_0$ being the fourth masking parameter,
" | " being the fourth mixing operator.

13. A method according to claim 12, wherein the fourth mixing operator (" 51 ") is an XOR operator.

14. An electronic device comprising a hardware controller for protecting a cryptographic process by
- a first masking stage comprising a first masking step to mask input data;
- a second masking stage defined by a plurality of computation rounds being successively performed by the hardware controller downstream from the first masking step to produce masked output data based on the masked input data and the secret key, with the masked input data from the first masking step being used so that intermediate data associated with each computation round is masked, and with data being manipulated by the second masking stage within each computation round also being masked, each computation round comprising
  - a second masking step to mask a result of a previous computation round,
  - a substitution step to substitute the masked result of the previous computation round by using a masked non linear operator (SBOX'), and
  - a second unmasking step to unmask a result of the substitution step;
- said first masking stage comprising a first unmasking step performed after a last computation round in said second masking stage to unmask the masked output data therefrom; and
- a third masking step performed before a first computation round to produce the masked non linear operator (SBOX') in the substitution step, with third masking step being performed by the hardware controller verifying the following relation, for each data (A):

$$SBOX'(A@X_3)=SBOX(A)\#X_2, \text{ where}$$

$X_2$ is a second masking parameter, $X_3$ is a third masking parameter, SBOX is a non linear operator, " # " is a second mixing operator and " @ " is a third mixing operator.

15. An electronic device according to claim 14, wherein:
- during the first masking step, a first masking parameter is mixed, using a first linear mixing operator, with the input data to provide a masked input data at the first computation round; and
- during the first unmasking step, a contribution made by the first masking parameter to a result of the N-th computation round is subtracted from the result of the N-th computation round.

16. An electronic device according to claim 14, wherein, during a second unmasking step of the computation round, a contribution made by the second masking parameter to the result of masked non linear operator SBOX' is subtracted from the result produced by the masked non linear operator SBOX'.

17. An electronic device according to claim 16, wherein a computation round comprises the following steps, executed in the following order:
- (ET2) expansion of a right-hand part of a masked intermediate data previously computed by a preceding computation round;
- (ET3) masking of the result of the preceding step ET2 by the third masking parameter using the third mixing operator;

(ET4) removal of a contribution made by the first masking parameter from the result of the previous step ET3;

(ET5) mixing of the result of the previous step with an updated derived key;

(ET6) substitution of the result of the previous step ET5 by the masked non-linear operator SBOX' and supply of a result that is masked by the second masking parameter;

(ET7) permutation of the result of the previous step ET6;

(ET8) addition, via an XOR operation, of a left-hand part ($L'_{1-i}$) of the previously computed intermediate data to the result of the previous step ET7; and (ET9) removal of the contribution made by the second masking parameter to the result of the previous step ET8, to provide a right-hand part of the updated intermediate data, of which a left-hand part is equal to the right-hand part of the previously computed intermediate data.

18. An electronic device according to claim 17, wherein at least one of the masking parameters is chosen randomly.

19. An electronic device according to claim 18, wherein at least one of the first mixing operator, the second mixing operator and the third mixing operator is a XOR operator.

20. An electronic device according to claim 19, wherein the hardware controller further performs:

a derived key scheduling step to provide an updated derived key from the private key according to a key scheduling process;

a fourth masking step, performed before the derived key scheduling step, to mask the private key using a mixing parameter so that the updated derived key is different for each key scheduling process.

21. An electronic device according to claim 20, wherein the key scheduling process comprises a plurality of derived key scheduling steps executed successively, a derived key scheduling step providing a masked updated derived key at a same computation round and providing an updated masked private key from a previously computed masked private key;

wherein the same computation round comprises the following steps, performed between step ET3 and step ET6:

(ET5) mixing of a result with the updated masked derived key; and (ET12) removal of the contribution made by the mixing parameter from the result of the step ET5.

22. An electronic device according to the claim 21, wherein the fourth masking step is performed before the first derived key scheduling step.

23. An electronic device according to the claim 21 wherein the fourth masking step is performed before each derived key scheduling step.

24. An electronic device according to claim 20 wherein, during the fourth masking step, a randomly chosen masking parameter is mixed with the private key via a fourth masking operator to provide a masked private key, the masked derived key being computed from the masked private key.

25. An electronic device according to claim 24 wherein, during the fourth masking step, the following operation is performed:

$$K'_0 = K_0 | Y_0,$$

$K'_0$ being the masked secret key,
$K_0$ being the secret key,
$Y_0$ being the fourth masking parameter,
" | " being the fourth mixing operator.

26. An electronic device according to claim 25, wherein the fourth mixing operator (" | ") is an XOR operator.

\* \* \* \* \*

UNITED STATES PATENT AND TRADEMARK OFFICE
CERTIFICATE OF CORRECTION

| | |
|---|---|
| PATENT NO. | : 8,306,218 B2 |
| APPLICATION NO. | : 10/467698 |
| DATED | : November 6, 2012 |
| INVENTOR(S) | : Romain et al. |

It is certified that error appears in the above-identified patent and that said Letters Patent is hereby corrected as shown below:

In the Claims

At Column 14, Line 6, in Claim 13,   Delete: "operator ("51") is"
                                     Insert: -- operator ("|") is --

Signed and Sealed this
Twenty-eighth Day of May, 2013

Teresa Stanek Rea
*Acting Director of the United States Patent and Trademark Office*